(12) United States Patent
Ament et al.

(10) Patent No.: US 6,402,217 B1
(45) Date of Patent: Jun. 11, 2002

(54) EASY-TO-USE ROLLER BLIND

(75) Inventors: Eduard Ament, Aichwald; Holger Seel, Aidlingen; Herbert Walter, Ebersbach, all of (DE)

(73) Assignee: Baumeister & Ostler GmbH & Co. (DE)

( * ) Notice: Subject to any disclaimer, the term of this patent is extended or adjusted under 35 U.S.C. 154(b) by 0 days.

(21) Appl. No.: 09/319,404

(22) PCT Filed: Dec. 4, 1997

(86) PCT No.: PCT/DE97/02837

§ 371 (c)(1),
(2), (4) Date: Jul. 19, 1999

(87) PCT Pub. No.: WO98/24657

PCT Pub. Date: Jun. 11, 1998

(30) Foreign Application Priority Data

Dec. 6, 1996 (DE) .......................................... 196 50 775

(51) Int. Cl.[7] ............................. B60R 11/00; B60N 3/00
(52) U.S. Cl. ...................... 296/37.16; 276/37.8; 276/98
(58) Field of Search ............................. 296/37.16, 37.8, 296/98, 146.8, 106

(56) References Cited

U.S. PATENT DOCUMENTS

| 3,909,060 | A | * | 9/1975  | Katayama         | 296/37.16 |
|-----------|---|---|---------|------------------|-----------|
| 3,910,625 | A | * | 10/1975 | Menard           | 296/37.16 |
| 4,073,534 | A | * | 2/1978  | Hira             | 296/37.16 |
| 4,127,301 | A | * | 11/1978 | Syrowik          | 296/37.16 |
| 4,202,578 | A | * | 5/1980  | Roullier et al.  | 296/37.16 |
| 4,222,600 | A | * | 9/1980  | Cripps et al.    | 296/37.16 |
| 4,222,601 | A | * | 9/1980  | White et al.     | 296/37.16 |
| 4,289,345 | A | * | 9/1981  | Tamamushi et al. | 296/37.16 |
| 4,357,046 | A | * | 11/1982 | Lalanne          | 296/37.16 |
| 4,479,675 | A | * | 10/1984 | Zankl            | 296/37.16 |
| 4,728,141 | A | * | 3/1988  | Motozawa et al.  | 296/37.16 |
| 5,857,725 | A | * | 1/1999  | Croke et al.     | 296/37.16 |
| 5,865,497 | A | * | 2/1999  | Klein et al.     | 296/37.16 |
| 6,099,222 | A | * | 8/2000  | Moore            | 296/37.16 |
| 6,349,986 | B1| * | 2/2002  | Seel et al.      | 296/37.16 |

* cited by examiner

Primary Examiner—Joseph D. Pape
Assistant Examiner—Hilary Gutman
(74) Attorney, Agent, or Firm—Leydig, Voit & Mayer, Ltd.

(57) ABSTRACT

A roller blind (15) comprising a spring actuated roller blind for the luggage area (2) of a vehicle which includes a positive or compulsory guiding device (27) to which the front edge of the roller blind (17) is detachably connectable. The positive guiding device (27) ensures that the roller blind (17) can be moved upwardly to an intermediate position when the tailgate (8) is opened in order to provide easy access to the luggage area without having to fully roll the roller blind (17) back into the roller blind housing (16).

23 Claims, 10 Drawing Sheets

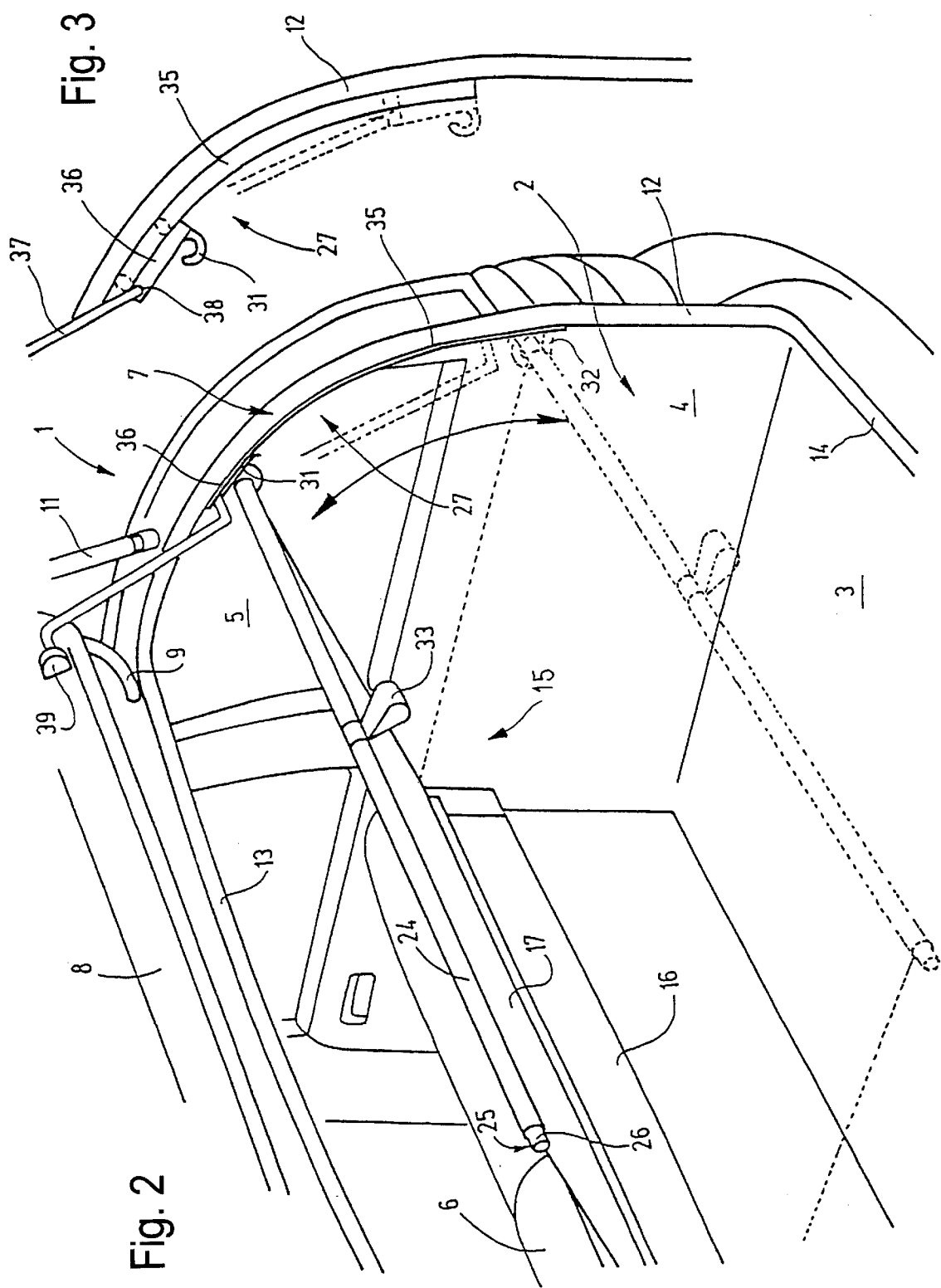

EASY-TO-USE ROLLER BLIND

FIELD OF THE INVENTION

The present invention relates to devices used in automobiles, and more particularly to an improved roll cover for covering the cargo space of an automobile.

BACKGROUND OF THE INVENTION

Roll covers are increasingly used in station wagons in the cargo space because the cargo space would be fully visible from the outside without appropriate measures. The roll cover is capable of protecting the upward facing cargo space from outside viewing. The roll cover is bordered on one side by the rear bench back rest, the two car body walls and the tailgate. On the other hand, the cover allows the full utilization of the cargo space when it is rolled up in its rest or storage position where it hardly needs any space.

To cover a cargo space, two different systems are known. One system is designed as a type of folded cover consisting of a cover sheet with rods or hoops. The hoops run on guide rails at the car body side and must be somewhat parallel. When opened, intermediary positions are possible, but their installation is costly because of the guide rails.

The roll cover can be placed at any time in various intermediate positions.

The other system, as shown in U.S. Pat. No. 5,224,748, for example, is designed as a type of spring-actuated shade. It consists of two connected end caps with a rotating winding roller in the middle. The roller blind is attached to the winding roller, while the other end is connected to a pull bar. The winding roller is prestressed with a spring in the direction where the roller blind is rolled up.

On the side of the roller blind path, two guide rails with two hooks each are attached. One hook is located at the tailgate opening while the other is arranged half-way from the winding roller and the hook above to allow a half-opened position of the roll cover. To reach this position, the user must manually unhook the pull bar from the rear hook and transfer it to the front hook; he has to control this movement himself.

Another solution is offered by DE 39 41 711 C2. The cargo space cover is again designed as a type of spring-actuated feed shade. It consists of an oblong cassette housing with a rotating winding roller. The roller blind is attached to the winding roller and its free end is connected to the pull bar. The pull bar is hooked into the inside of the tailgate at such a height that the roller blind pull bar, which extends horizontally across the cargo space will change when the tailgate is closed.

The attachment of the pull bar on the inside of the tailgate is supposed to increase comfort.

The connection with the tailgate lifts the roller blind automatically when the tailgate is opened upward. Therefore, the access opening is automatically opened with the open tailgate without requiring additional movements such as unhooking the pull bar.

A significant disadvantage of the known solution is that the pull bar is necessarily pulled out of the tailgate opening when it is opened, or is to be closed by the tailgate, and moved a bit upward. Due to the roof configuration in modern car body forms, the tailgate is increasingly narrowed toward the roof, causing the sides of the roller blind in the well-known design to rub at the edges of the tailgate opening. In this area, the cover suffers unsightly damage. The known solution has another disadvantage in that the maximum extent of the roller blind to be rolled onto the winding roller does not result from the size of the cargo space opening but rather from the location of the final position of the pull bar when the tailgate is open. This amount of roller blind is significantly larger than what is needed for covering only the cargo space opening.

OBJECTS AND SUMMARY OF THE INVENTION

In view of the foregoing, an object of the invention is to create a roll cover that is designed like a spring-actuated shade and easy to handle without being damaged when the tailgate is opened.

The present invention provides these and other advantages and overcomes the drawbacks of the prior art by providing a roll cover having a compulsory guiding device which allows the cover to be moved upward when the tailgate of the automobile is opened so as to allow easier access into the cargo space.

The use of a compulsory or positive guiding device with an appropriate design prevents the pull bar from being pulled out of the tailgate opening when the tailgate is opened, while creating at the same time a relatively large access to the cargo space. The user is not required to unhook the roll cover after opening the tailgate and to let it wind completely onto the winding roller to get access to the cargo space. Rather, this form of a compulsory guiding device allows the pull bar to hold in an intermediate position which results in similar comfort as with roll covers that work with a gather principle and rods on rails.

The roller blind is generally as large as the length of the cargo space opening, measured in the direction parallel to the longitudinal direction of the vehicle.

Even if the compulsory guiding device must be actuated manually, there is a substantial simplification in that the operator does not have to bend forward to reach the intermediate position in order to guide the pull bar up to the roll cover housing. The compulsory guiding device lifts the pull bar and prevents an unpleasant forward bent body position.

The intermediate position can be realized in several ways. When in the intermediate position, the pull bar lies in a height clearly above the closed position, while in other cases the pull bar in the intermediate position is only retracted in the direction of the housing.

The circumstances are technically very simple when the compulsory guiding device holds the pull bar also in the closed roll cover position so that re-hanging is not needed.

The force for transferring the pull bar from the closed position to the intermediate position or the reverse can be accomplished by means of coupling links that couple the movement of the pull bar at least over a part of their motion field with the movements of the tailgate. These coupling links can be designed as pressure resistant and/or flexible. If only the movement direction is considered, it suffices that the coupling links transfer only the tensile force. In the event that the movement exerted on the tailgate end is higher than the lift on the pull bar with the compulsory guiding device, the coupling links can also be flexible.

The compulsory guiding device can be designed in different ways. A relatively simple compulsory guiding device consists of two one-armed levers that are arranged in the cargo or trunk space in a pivoting manner. They face from their hinge point in the direction of the cargo opening and have receptacles for the ends of the pull bar at their other ends. By pivoting the levers upward either manually or controlled by the tailgate motion, the access opening is reached in the desired size.

Another compulsory guiding device uses guide rails attached to the lateral rims of the cargo space opening. Slides are running on these guide rails. Each of these slides has a receptacle for the pull bar so that the pull bar, i.e., the extended end of the roller blind, can be placed at the appropriate height so that access to the cargo space is unimpeded.

When using the guide rails and slides, the slides are kinematically connected with the tailgate. The connection with the tailgate has, besides the greater comfort for the operation from outside, the technical advantage that it forces a synchronous movement of the pull bar ends and prevents jamming.

Depending on the way the connecting or coupling links between the tailgate and the compulsory guiding device are designed, springs must be used to enforce an end position of the compulsory guiding device, or such springs are not needed.

No springs are needed when the coupling links between the tailgate and the compulsory guiding device are rigid and inflexible. In contrast, springs are needed when the coupling links are not tensile pressure resistant. The latter can be advantageous example, when no good directional point for the coupling links can be found at the tailgate so that their movement stroke corresponds with the movement stroke of the compulsory guiding device. If the stroke is too small, the compulsory guiding device could, for example, be pre-stressed with springs in the opened position and be withdrawn to the closed position against the effect of these springs when the tailgate is closed.

The reverse solution is also applicable. The springs can run either in the guide rails or prestress the levers as coil springs.

Another embodiment instead of the use of coupling links to bring the pull bar automatically in the intermediate position consists of the utilization of the retracting force with which the roller blind is wound onto the winding roller. In order to assure a certain synchronization with the motion or the position of the tailgate, respectively, a locking device has to be installed that functions together with the compulsory guiding device. This locking device has three different states. In the first state, a movement of the pull bar is arrested from a closed position. This allows the user to bring the pull bar permanently in a position corresponding with the closed position of the roll cover. The locking device has a second state when the pull bar can move unimpeded from the closed position to the intermediate position by means of the compulsory guiding device. The third state of the locking device holds the pull bar in the closed position depending on the position of the tailgate. The pull bar is automatically placed in this position when the tailgate is closed.

The kinematic circumstances are very simple when these three states of the locking device are realized by at least two different positions of the pull bar. In this, the second and the third state correspond loosely with the different closing positions of the roll cover; the positions of the pull bar differ from one another only by a few millimeters.

The situation is especially simple when the pull bar works together with the locking device because the hooking in and out is very simple.

A very simple locking device results when a groove is provided into which the pull bar is placed. The groove has a pocket-like recess or a slot so that the tensile force of the winding roller causes an automatic insertion of the pull bar end into the pocket; this position of the pull bar in the pocket corresponds with the first state of the locking device.

In order to transfer the pull bar out of the pocket in the third position, the pocket can either have a movable wall or a corresponding lifting link. This lifting link can be a cam that moves the pull bar from a position corresponding to the third position of the locking device when the tailgate is closed.

So that the pull bar remains in the third position as long as the tailgate is opened, a holder can be used that locks the groove during that time.

This holder can be a ram seated at the tailgate or a slide activated by a cable or a ram that extends into the motion path of the tailgate.

These and other features and advantages of the invention will be more readily apparent upon reading the following description of preferred exemplary embodiments of the invention and upon reference to the drawings wherein:

BRIEF DESCRIPTION OF THE DRAWINGS

FIG. 2 shows another embodiment of the roll cover with slides and rigid couplings in a representation similar to FIG. 1.

FIG. 3 is a top view showing the right tailgate rim of the embodiment in FIG. 2.

While the invention will be described and disclosed in connection with certain preferred embodiments and procedures, it is not intended to limit the invention to those embodiments. Rather it is intended to cover all such alternative embodiments and modifications as fall within the spirit and scope of the invention.

DETAILED DESCRIPTION OF PREFERRED EMBODIMENTS

Figure 1:
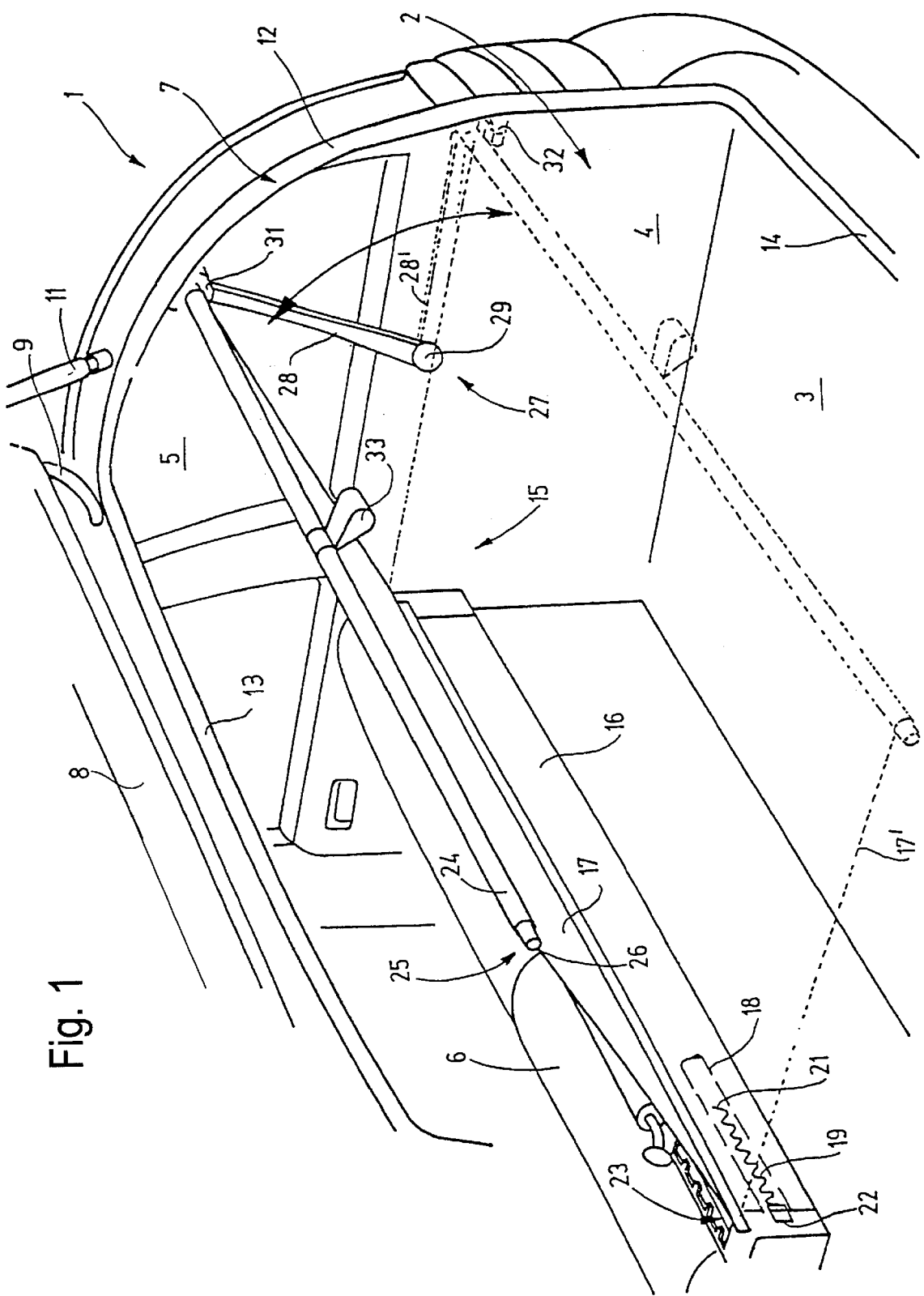
FIG. 1 is a perspective view showing a roll cover of the invention in the extended upward position in the trunk of a car with an open car body.

FIG. 1 shows a tailgate 1 of a station wagon or car in perspective. Its cargo space 2 is bordered by a bottom 3 as well as two side walls 4 of which only the right side wall can be seen. A rear side window 5 is above side wall, and the seat back 6 of a rear bench forms the front boundary of the cargo space 2. The side window 5 ends with its lower rim at a distance above the bottom 3.

Access to the cargo space 2 is provided by the tailgate opening 7 which can be optionally locked by a tailgate door 8. The tailgate door 8 is connected with the auto body by means of hinges 9 and can be kept in an open position with a gas pressure spring 11. The tailgate opening is limited at the sides by two lateral rims 12 that run parallel to each other as far as the car body contour permits. The tailgate opening 7 is bordered by an upper rim 13 at the roof and a cargo board rim 14 located more or less at the bottom 3.

With the closed tailgate door 8, there is a cargo space open to above that is limited at the rim by the inside of the tailgate door 8, the two side walls 4 and the rear side of the seat back 6. This cargo space opening allows visibility from the outside into the cargo space 2.

To protect the cargo space 2 from outside viewing, a roll cover 15 is used. It comprises a housing 16 as well as a roller blind 17 to cover the cargo space opening.

The housing 16 is an oblong housing attached on the back rest of the seat back 6 and extending over its whole length. The interior of the housing 16 contains a winding roller 18 that can rotate at the end. The length of the winding roller corresponds approximately with the length of the housing 16.

The winding roller 18 is at least in one segment tube-like and contains a spring motor 19 that is connected at one end 21 with the winding roller 18 while its other end 22 is fixed in the housing 16.

The rim of the roller blind 17 is attached to the winding roller 18 and its other rim exits the housing 16 through a lengthwise slot 23. The slot 23 extends almost over the whole length of the housing 16 and parallel to the winding roller 18.

A loop 24 on the roller blind is located at a rim facing away from the winding roller 18. It contains an essentially rigid pull bar 25 whose ends protrude at the pegs 26.

To guide the pull bar 25 and thus also the front rim of the roller blind 17, a compulsory guiding device 27 is provided. This compulsory guiding device 27 comprises two one-armed levers 28 of which only one is visible due to the partial illustration of the tailgate 1.

The lever 28 can be pivoted around a horizontal axis with a hinge 29 at one of its ends on the side wall 4. The pivot axis extends parallel to this axis of the winding roller 18. The other end of the lever 28 has a fork-shaped receptacle 31 into which the peg 26 can be latched.

The not shown other lever is located in opposing relation at the other side wall coaxial to the visible lever 28. The exact location of the hinge 29 is explained in the following function description.

The handling and working of the described roll cover 15 and of the compulsory guiding device 27 is as follows:

With the open cargo space 2, the roll blind 17 is in a rest position rolled up completely on the winding roller 18 due to the function of the spring motor so far that the loop 24 on the pull bar 25 abuts the slot 23 on the outside of the housing 16. The two loosely pivoting levers 28 are in the position 28' shown in dashes in FIG. 1 where they are held by stops 32 attached below on the respective side wall 4 next to the tailgate opening 7 and support the lever 28 below its receptacle fork 31.

When no visibility is wanted into the cargo space, the roll cover 17 is drawn out of the housing 16 against the effect of the spring motor 19 by means of the pull bar 25 and possibly with the aid of a loop configured pull chain 33 attached to it. The roller blind 17 is pulled out so far until the two pegs 26 can be hooked into the two receptacle forks 31 on the two levers 28. The receptacle forks are open to the top in this position. In addition, the arrangement is made in the way that the now stretched roller blind, shown with dashes in FIG. 1 in this position and marked with 17', runs below the pivot axis of the bearing. This results in a minor torque in each lever 28 in the position 28' that presses the lever 28 downward onto the stops 32.

The stretched-out roller blind 17' runs horizontal and slightly below the lower rim of the side window 5 under the upper rim of the seat back 6.

When the tailgate door 8 is closed, the cargo space 2 can no longer be looked into.

If needed, additional stops at the tailgate door 8 press the pull bar 25 down and thus the levers 28 against the stops 32 so that they will not rattle or snap upward during driving vibrations.

When the cargo space is being loaded or unloaded, the access opening between the pull bar 25 is pivoted downward and the upper rim of the cargo board rim 14 remaining after opening the tailgate door 8 will be too small to permit comfortable handling. Therefore, the pull bar 25 is grasped manually and lifted and moved under the effect of the compulsory guiding device 27 in a circular arch with the axis of the hinges 29. The pivot motion is limited by other stops located, for example, in the hinges 29. The final position corresponds with the position shown in FIG. 1 with solid lines.

The two levers 28 are kept in a lifted position by the spring motor 19, as is illustrated, and the access opening to the cargo space 2 is now clearly enlarged and the roller blind is no longer in the way. Because of the compulsory guiding device, it is not necessary to let the roller blind 17 roll back into the housing 16.

After loading and unloading the cargo space 2, the roll cover 15 can be returned to the covering position along the dashes simply by moving the pull bar 25 or the front rim of the roller blind 17, respectively, downward until the levers 28 rest on the stops 32 as described above.

It is also possible at any time, like with any window shade, to remove the roller blind 17 completely by unhooking the pull bar 25 with its two pegs 26 out of the receptacles 31 and guiding it manually in the direction of the slot 23. With this motion, the spring motor 19 rolls the roller blind 17 again on the winding roller.

FIG. 2 shows a different embodiment of the roll cover 15. The necessary components have already been described in conjunction with FIG. 1 and they are either identical or have the same function and are used with the same reference number without a repeated explanation.

FIG. 2A is a fragmentary perspective illustrating the spring motor drive for the roller blind shown in FIG. 2, similar to the spring drive depicted in the FIG. 1 embodiment.

The significant difference to the embodiment illustrated in FIG. 2 is that the compulsory guiding device 27, as shown in FIGS. 2 and 3, comprises two guiding rails 35 attached inside the car body next to the side rims 12 of the tailgate opening 7. The figures illustrate again only one of the two guide rails because the other cannot be seen due to the cut-off presentation.

The guide rails 35 each have a C-shaped profile and form for the schematically shown slides 36. Each slide 36 carries at its lower end the fork-shaped receptacle 31 in which the two pegs 26 of the pull bar 25 are hooked.

Additionally, each slide 36 is kinematically connected to the tailgate door 8 via a connecting rod 37. The connecting rod 37 is connected at 38 so that it can rotate with the slide 36 and hinged at 39 at the tailgate door 8 adjacent to its hinge.

The rod 37 is rigid and forces a motion of both slides 36 along their respective rails 35 during the opening and closing motion of the tailgate door 8.

In principle, the handling of the roll cover in FIGS. 2 and 3 is the same as the handling in the embodiment shown in FIG. 1.

When the cargo space 2 must be closed, the pull bar 25 with its pegs 26 is hooked into the two slides 36. These two slides 36 are in their upper position when the tailgate 8 is open and hold the hooked-in pull bar 25 in an upper position which is higher than that pull bar position when the cargo space 2 is closed.

The position shown with lines in FIG. 2 in which the tailgate door 8 is pivoted down, the two rods 37 by necessity also press the slides 36 in the guide rails downward. When the tailgate door 8 is completely closed, the roller blind 17 runs almost horizontal, as shown with dashes in FIG. 2.

When the tailgate door 8 is opened, the slides 36 are again pulled upward and also lift the roller blind 17 up.

Figure 4:
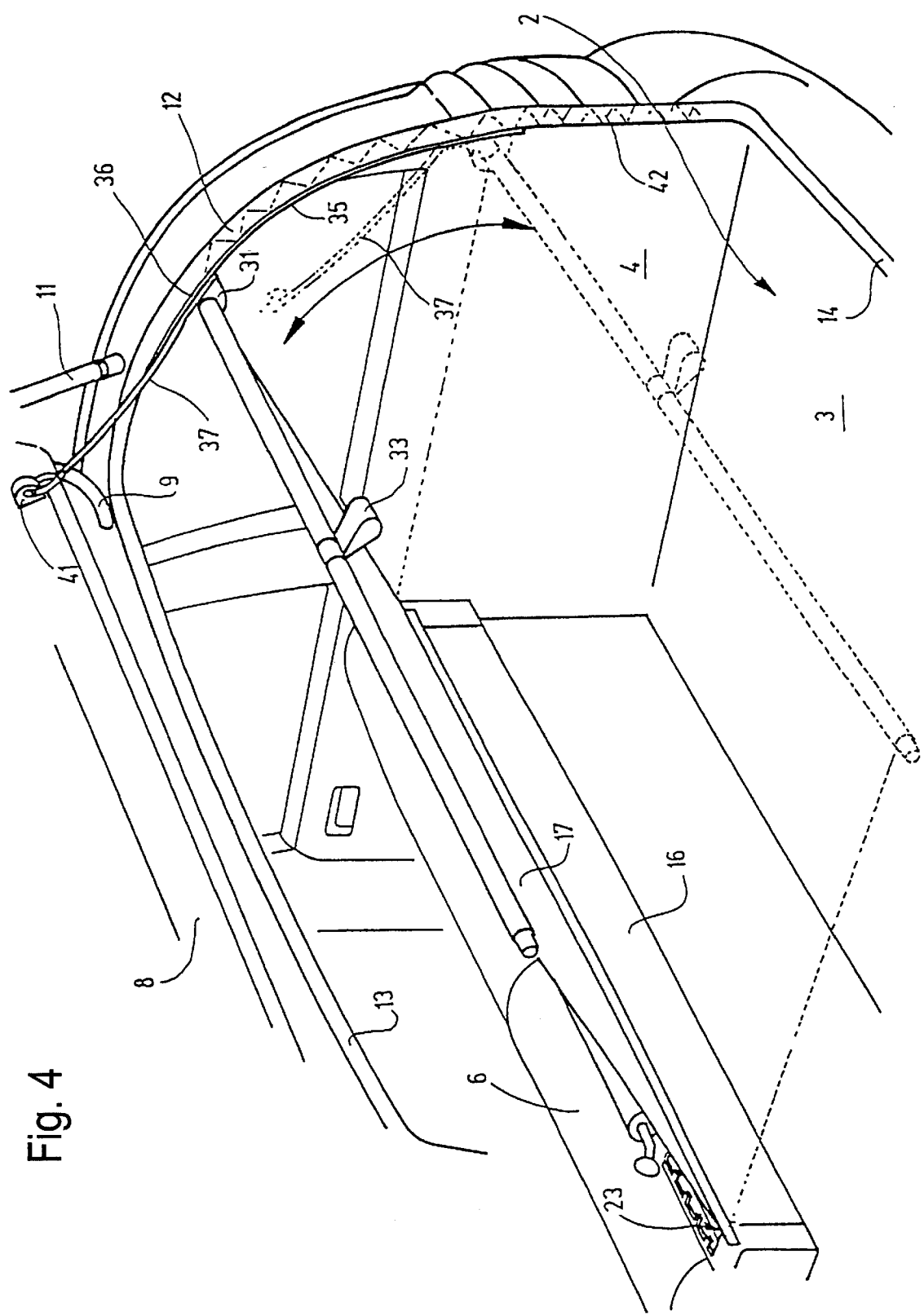
FIG. 4 shows an embodiment of the roll cover similar to the one in FIG. 1 but with flexible coupling links.

FIG. 4 shows that it's possible to use rope-like coupling links 37 instead of the rigid coupling links. The rope-like coupling links are attached to an ear 41 located on the inside of the tailgate door 8.

Since a coupling link 37 of this type can only move the respective slide 36, a pre-stressed spring 42 is provided for the opposite movement and runs along the respective guide rail and prestresses the slide 36 against the effects of the coupling link 37. In the illustrated embodiment, the spring runs as a tension spring from slide 36 to the lower end of the guide rail 35, i.e., the slides 36 are constantly prestressed by the springs 42 in a position corresponding to the closed roll cover. When the tailgate door 8 is closed, the slides 36 run downward because of the effect of the springs, while they are pulled up against the effects of the springs when the tailgate door 8 is opened. Otherwise the handling and function is identical to that described with the previous exemplary embodiments.

Although not illustrated in detail, the coupling links 37 can also have levers with a compulsory guiding device 27 and, conversely, embodiments are possible where the compulsory guiding device 27 has rails but no coupling links 37. However, the use of coupling links has the significant technical advantage that, controlled by the tailgate door 8, both ends of the pull bar 25 are moved in a synchronous manner and no jamming can occur.

Figure 5:
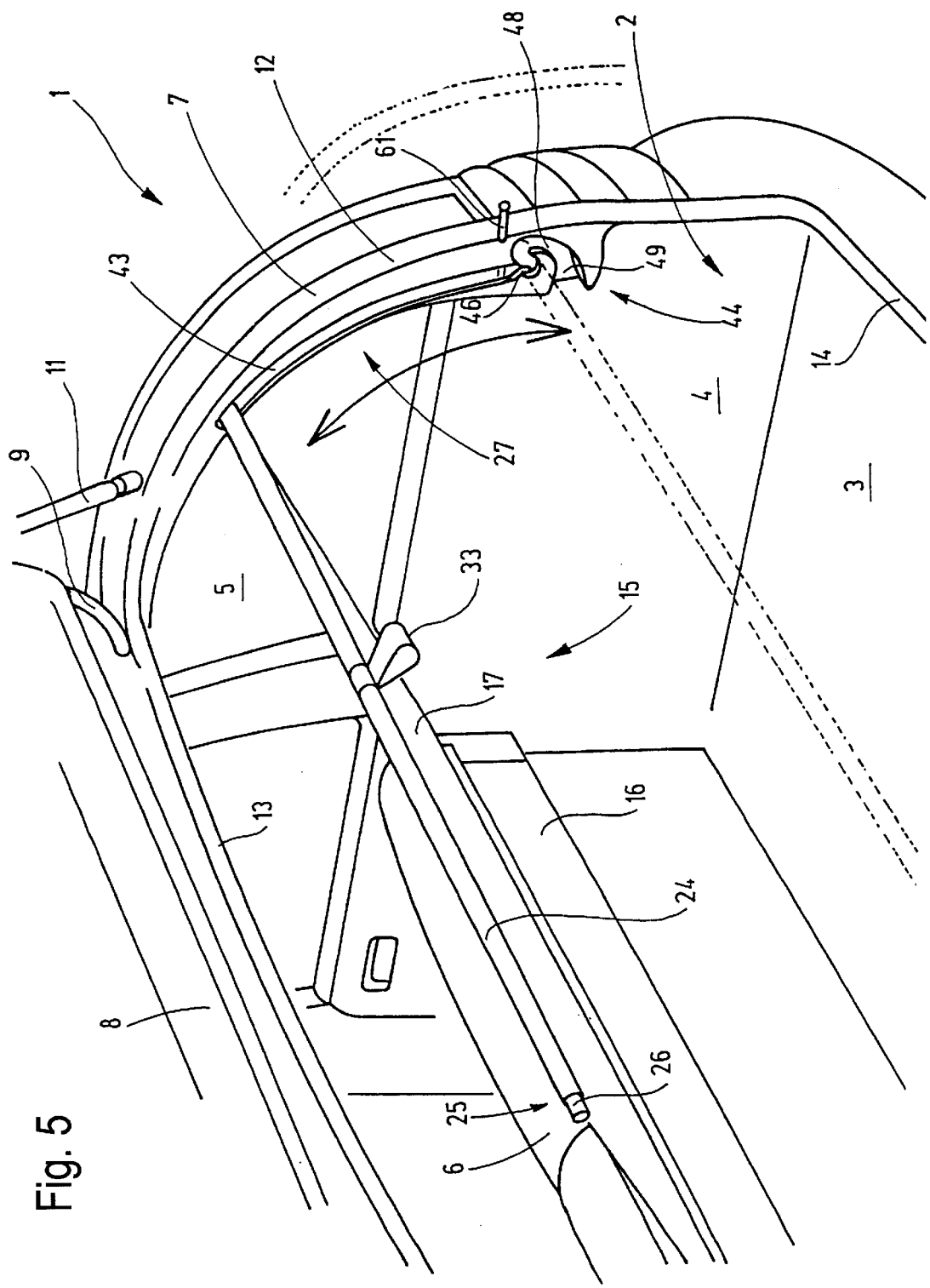
FIG. 5 is a perspective view showing another embodiment of the roll cover of the invention in the cargo space of an automobile in an intermediate position with an open car body.

FIG. 5 shows a different embodiment. The necessary components have already been described in conjunction with FIG. 1 and they are either identical or have the same function and are used with the same reference number without a repeated explanation.

The exemplary embodiment in FIG. 5 has as the compulsory guiding device 27 two grooves 43, only one of which is shown because of the partial perspective. The groove 43 is rectangular in its cross-section and begins at the front of the vehicle in the side rim 12 of the tailgate opening 7 facing in the direction toward the roof rim. The groove 43 ends a significant space in front of it. Its width corresponds with the diameter of peg 26. Its end closest to the roof is closed.

At the side rim 1.2 on the other side of the tailgate opening 7 (not shown) is the mirror-image groove 43. Both grooves are opened to each other and follow the rear contour beginning at the front in the direction of the roof. Because of this design, the distance of the lower end of 43 from the cover housing 16 is larger than the distance of the upper end, i.e., when the peg 26, starting with the front, is moved through the groove 43 in the direction of its roof side end, the roller blind 17 is driven forward a short distance.

Because of this arrangement, the roll cover 15 will constantly assume the position shown in FIG. 5. In order to cover the cargo space before closing the tailgate door 8, the lower end of the groove 43 has a locking device 44. The locking device 44 is visible in FIG. 5 and has its mirror image on the left vehicle side. The explanation of the arrangement and effect of the locking device 44 can be limited to one of the two locking devices.

Figure 6:
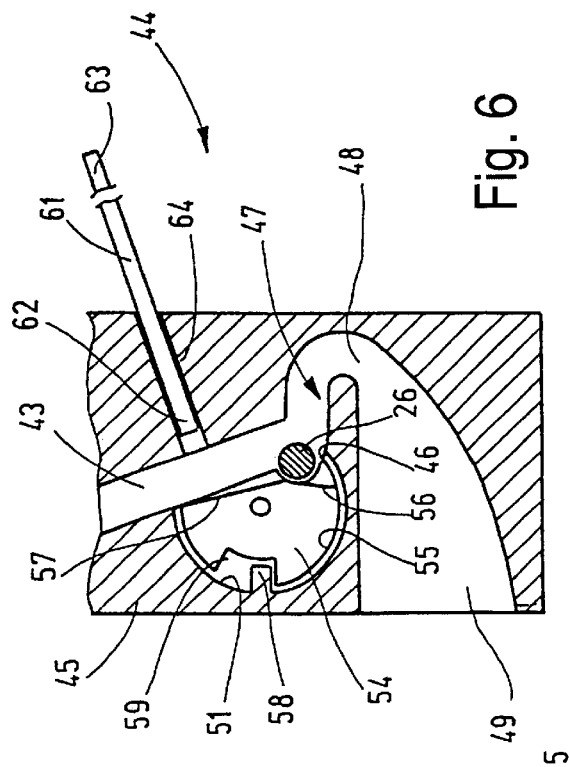
FIG. 6 is a section view taken in plane in vertical relation to the pull bar showing the locking device located at the side and at the end of the guiding groove for the roll cover according to FIG. 5 in its first state.
Figure 8:
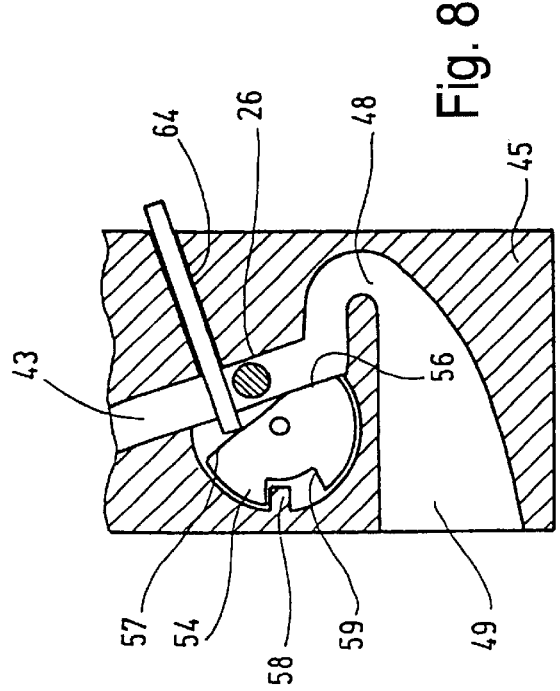
FIG. 8 is a view similar to FIG. 6 showing the locking device in FIG. 6 in another state or condition.
Figure 7:
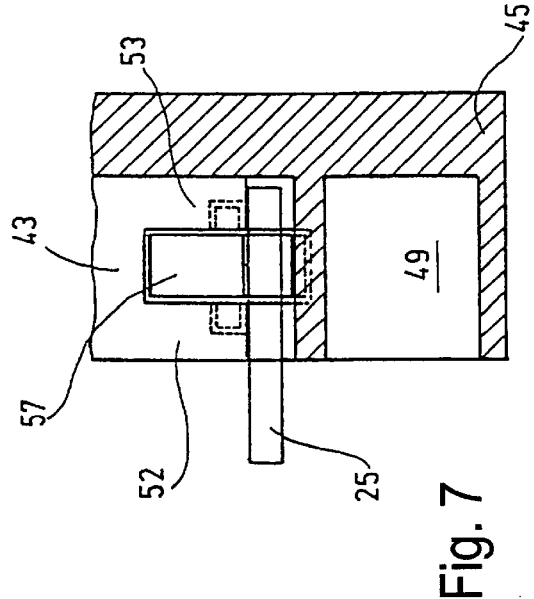
FIG. 7 is a sectional view showing the locking device according to FIG. 6.

FIGS. 6 to 8 show the locking device 44 schematically. As can be seen in the figures, the groove 43 runs in the area of the locking device 44 through a housing 45 shown cut off. The groove 43 forms on its lower end in its forward side wall a pocket or a recess 46 in the direction of the winding roller 18 and runs additionally into another receptacle groove 47 which on the level of the recess 46 leads at first horizontally in the direction toward the invisible tailgate opening 7. After a short stretch, the receptacle groove 47 forms a descending 180° arch 48 after which the receptacle groove 47 widens at 48 in a funnel shape and forms a joining funnel.

On the side facing away from the tailgate opening, the housing 45 contains a partially cylindrical recess 51 that cuts the front side wall of the groove 43 (left in the figure) as can be seen in FIG. 7; i.e., on both sides of the recess 51, the groove wall segments 52 and 53 remain and continue into the recess 46. The partially cylindrical recess 51 contains a lifting element 54 in the form of a sector-like disk that is contained in the recess 51 and can be pivoted to a limited extent. The lifting element 54 is limited by a cylindrical outer surface with the same diameter as the partially cylindrical recess 51 as well as by two straight surfaces 56 and 57 running like tendons. The surfaces 56 and 57 face the groove 43. The lifting element 54 can be pivoted around an axis that runs parallel to the adjacent side wall of the groove 43 and extends horizontally.

The pivot limitation of the lifting element 54 is attained by means of a rib 58 protruding in the recess which works together with the arch-like recess 59 in the cylindrical surface 55.

In addition, the housing 45 contains a sliding ram 61; its inner end 62 faces the groove 43 and its outer end 63 protrudes into the motion path of the tailgate door 8 on the level of the front. The ram 61 forms, at the same time, a holder and is attached as a slider by means of the boring 64 whose axis faces the cylindrical recess 51 above the pivot axis of the lifting element 54.

The roll cover 15 in FIG. 5 functions as follows:

The start position of the roll cover 15 is shown in FIG. 5. In this position the pegs 26 of the pull bar 25 abut to the end of the groove 43 that is closest to the roof. The pegs 26 are held in this position by the reverse force of the spring motor 19 of the winding roller.

To cover the cargo space opening before closing the tailgate door 8, the user exerts downward pressure on the rim of the roller blind 17 that is stiffened by the pull bar 25. The pegs 26 slide though the side grooves 43 of the compulsory guiding device 27 until they reach its lower end. Again, due to the spring motor 19, the two pegs 26 are pulled in the recess 46, and at the same time the disk-like lifting element 54 is turned in the direction shown in FIG. 6 which jumps back into its surface 56 against the clearance of the recess 46. On each side of the tailgate opening 7, the respective peg 26 is locked in the recess. The spring motor keeps the roller blind 17 tight but it cannot pull the roller blind 17 back into the start position of FIG. 5 because the pegs 26 are locked in the recesses 46. The roll cover is in its closed position.

The user can now pivot the tailgate door 8 downward and lock the tailgate opening 7. Toward the end of the closing motion, the door 8 comes into contact with the outside ends 63 of the two rams 61 so that the continued closing motion of the tailgate door 8 moves the rams 61 forward in the direction of the disk-like lifting element 54. This causes the inner end 62, as shown in FIG. 8, to enter the groove 43, cross over it and enter the recess 51 behind it. Due to the entering in the recess 51, the ram touches the surface 57 and turns the disk-like lifting element 54 around its horizontal axis. The disk-like lifting element presses the peg 26 out of the recess 46 with the lower surface against the effect of the spring motor 19. The retractive force of the spring motor 19 now causes the peg 26 to slide upward on the perpendicular surface 56 on the likewise perpendicular groove side wall until it is touching the ram 61 from below. The peg 26 is located in FIG. 6 above this position in so far that it cannot reach the recess 46 again without pressure from above on the pull bar 25.

Figure 9:
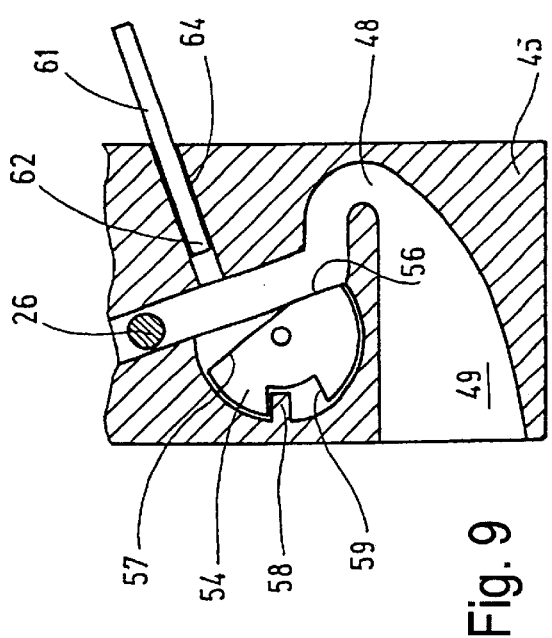
FIG. 9 is a view similar to FIG. 6 showing the locking device in FIG. 6 in still another state.

When the user opens the tailgate door 8 the next time, the ram 61 is pulled by a return spring (not shown) from the position in FIG. 8 back into the position in FIG. 6 which is identical with the position in FIG. 9. During this motion, the ram 61 that functioned earlier as a holder for peg 26 leaves the clearance of groove 43, and the peg 26 can slide to the upper roof-side end of groove 43 under the effect of the retractive force of the spring motor 19.

To prevent sudden movement, i.e., that the rim of the roller blind 17 jumps upward, an appropriate brake device preferably is provided that acts on the winding roller 18.

As was explained in the above function description, the locking device 44 comprises a total of three states. In the first state, as shown in FIG. 6, the respective peg 26 is reliably locked in the recess 46 and the roller blind 17 is fixed in the closed position. The second state of the locking device is shown in FIG. 9 with the complete release of the peg 26 that can move upward in groove 43 without hindrance. The third state shown in FIG. 8 is an intermediate state between the states in FIGS. 6 and 9 and corresponds to a "stand-by" state in which the roll cover 15 is waiting for another opening of the tailgate door 8 in order to reach the position in FIG. 5. The position of peg 26 and also of the pull bar 25 differs by a few millimeters in the first and the third state in FIGS. 6 and 8. Both positions are closed positions in which the cargo space opening is almost completely closed. In contrast, the position in FIG. 5 is an intermediate position where the rim facing the user is formed by the loop 24 and lifted almost up to the roof so that the cargo space opening is easily accessible from above.

If the user wants to open the cargo space completely or if he wants to remove the roll cover 15, he will first press the rim that is formed by the loop 24 downward so far until the pegs 26 lock again in the corresponding recess 46. He also can grasp the tube-like loop 24 and pull the roller blind 17 toward himself causing the peg 26 to move from the recess 46 into the receptacle groove 47. The further movement downward brings the peg 26 into the funnel 49 from which the peg 26 leaves the arresting device 44 completely so that the pull bar 25 can be moved back to the housing 16 on any path.

The hooking of the pegs 26 occurs in the reverse order in that these are threaded on both sides in the funnels 49 and brought upward to the position shown in FIG. 6.

Figure 11:
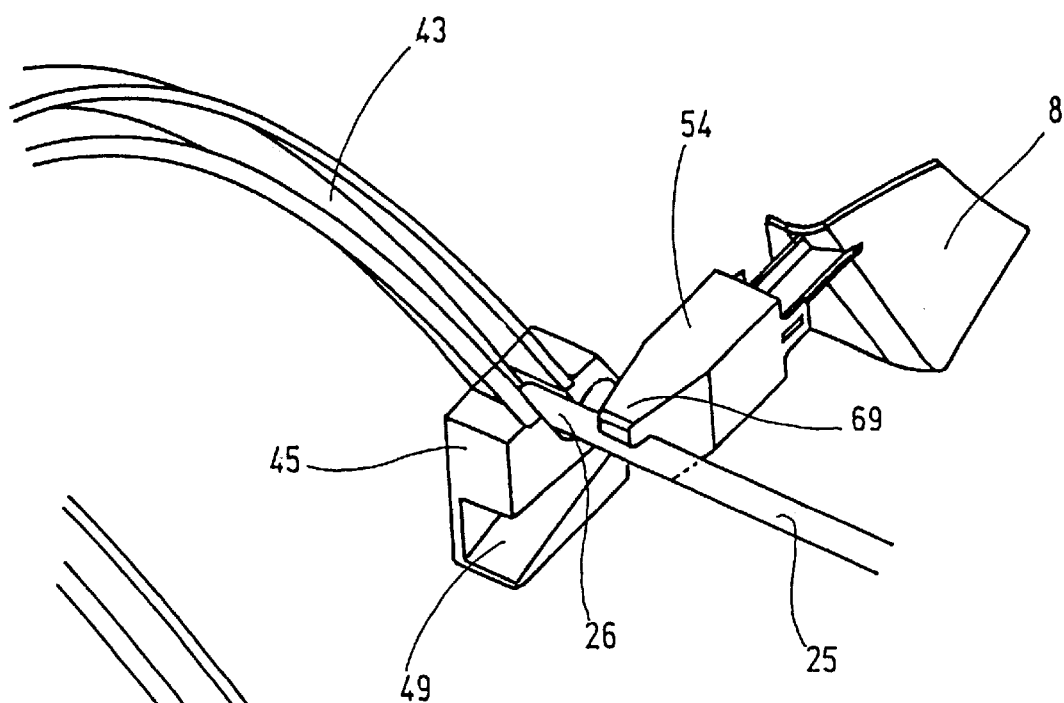
FIG. 11 is a perspective view showing the arrangement in FIG. 10.
Figure 10:
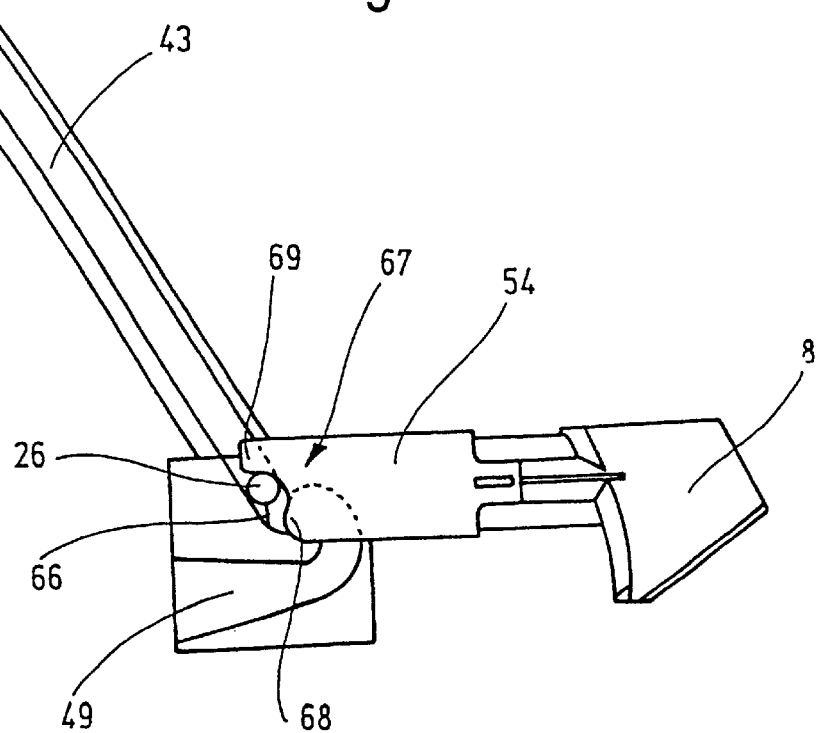
FIG. 10 is a lateral view showing another embodiment of the locking device for the arrangement in FIG. 5.

FIGS. 10 and 11 show a lateral or perspective view of an exemplary embodiment of the locking device 44 that differs from the embodiment described above in that the pocket is formed with a movable wall in the form of a locking slider 66 that protrudes from the rear in the space of groove 43 above the receptacle groove 47.

The lifting element 54 is seated on the inside of the tailgate door but here it does not have the form of a rotating disk but rather of a rigid arm that is attached on the inside of the tailgate door. The lifting element 54 has on its front end 67 facing away from the tailgate door 8 an offset 68 that turns into a holding nose 69 above it.

The function is as follows:

When the user brings the roll cover 15 to the closed position, the pegs 26 on both sides move to the respective locking device 44 where they press the locking slide 66 back and reach below it. This locks the respective peg 26 below the locking slider 66 as can be seen in FIG. 11. When the tailgate door 8 is closed, the lifting element 54 meshes with the peg 26 and presses the peg 26 with simultaneous back push on the locking slider 66 from the clearance of groove 43 so that the peg 26, as shown in FIG. 10, can reach above the locking slider 66. Because the nose 69 extends into the movement path of the peg 26, the peg 26 remains hanging below the nose 69 when the tailgate door 8 is closed. Only another opening of the tailgate door releases the peg 26 on each side so that it can slide through the groove 43 upward to its upper roof-side end.

While the position in FIG. 11 shows the first state of the above description, FIG. 10 shows the third state.

The receptacle groove 47 and the funnel 49 are present in the same manner.

Figure 12:
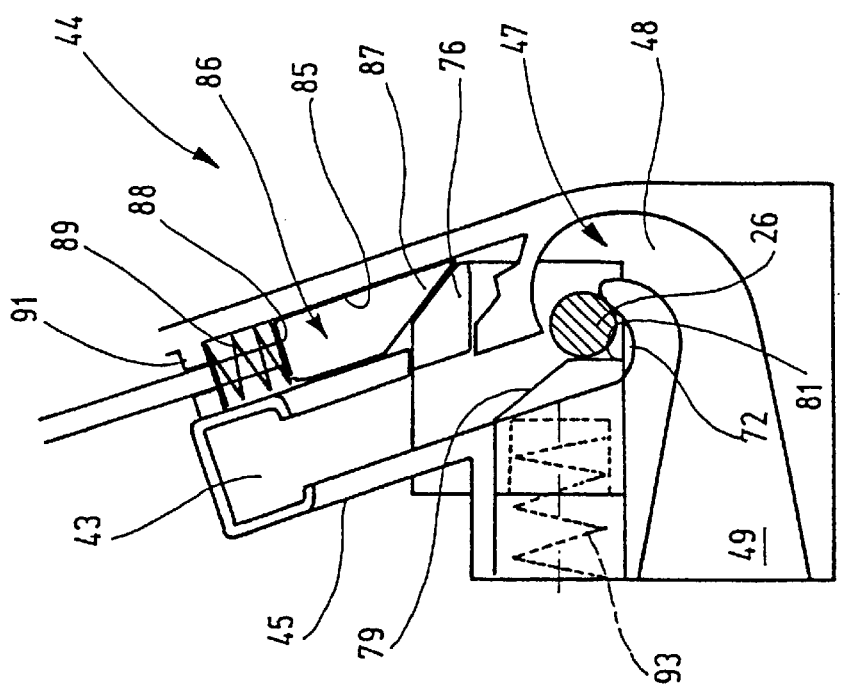
FIG. 12 is a lateral view showing a third embodiment of a locking device for the roll cover in FIG. 5 partially opened in the first state.

In the exemplary embodiments in FIGS. 6 through 11, the activation of the locking device 44 occurs toward the end of the closing motion of the tailgate door 8. If this is to occur at the beginning of the closing motion, i.e., in reverse at the end of the opening movement, the solution illustrated in FIGS. 12 through 14 is applied.

This construction is similar to that according to FIGS. 6 through 9.

The groove 43 of the compulsory guiding device 27 comes from above out of the housing 45. The receptacle groove 47 runs at its beginning there where it collides with groove 43, not horizontally but slightly ascending so that a hollow results at 72.

Figure 13:
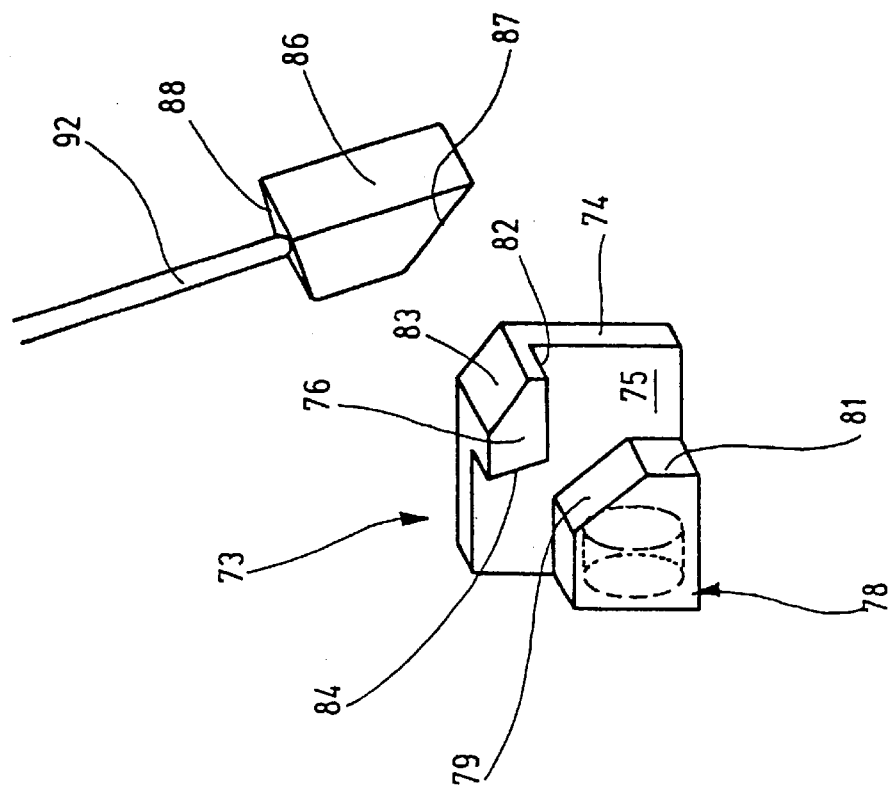
FIG. 13 is an enlarged perspective view showing the holder for the locking device in FIG. 12 as well as the actuating cam.
Figure 14:
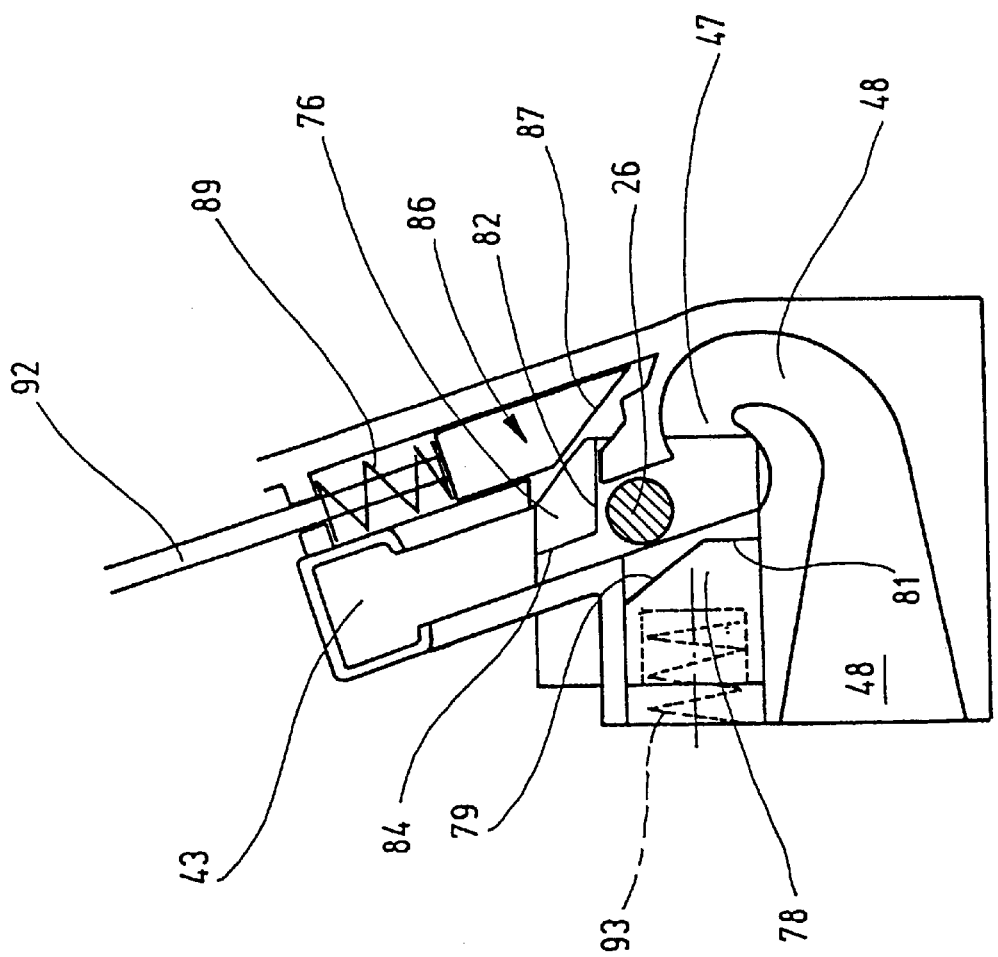
FIG. 14 shows the locking device in FIG. 12 in the third state.

Instead of the disk-like lifting element 54, a plate-like slide 73 is extended horizontally in a corresponding opening in the housing 45, shown in perspective in FIG. 13. The drawing shows the mounting location inside the vehicle. The slide 73 consists of a base plate 74 with two extensions 76 and 78 at its front side 75 facing in the same direction. The extension 78 carries the perpendicular surface 79 that converts into a vertically running even surface 81. These two surfaces 79 and 81 are the function surfaces of the extension 78.

The essential surfaces of extension 76 are the horizontal even surface 82 on the underside of the extension 76 in FIG. 13 and a perpendicular surface 83 that faces upward. In addition, the extension 76 is bordered at its circumference by a surface 84.

The exact location and effect of the individual surfaces is explained in the function description below.

A groove 85 runs parallel to groove 43 in the housing body 45 and is offset from groove 43 toward the tailgate opening 7. The groove 85 contains an actuating cam 86 with a cam surface 87 at its front sliding sideways. A strong helical spring 89 is supported on a back frontal surface 88 which is supported on the other end at shoulder 91 in the housing 45. In addition, an elastic and tension resistant cylindrical coupling link 92 is entering in the back frontal surface 88 of the actuating cam 86. The coupling link 92 is coupled with the tailgate door 8 at its other end (not shown) with a corresponding cam or wedge surface.

When the tailgate door 8 is completely opened, the actuation cam 86 is retracted against the effect of the helical spring 89 that is supported in the shoulder 91. This enables the slide 73 to be pushed forward with the help of a spring 93. The extension 78 protrudes in this position with its perpendicular surface 79 into the groove 43. The vertical surface 81 is in the center of the groove 43 and somewhat in front of the beginning of the receptacle groove 47. At the same time, the extension 76 has vanished out of the clearance of 43 in this position in so far that its side surface 84 is flush with the corresponding wall of the groove 43.

When the roll cover 15 is closed, the peg 26 can, coming from above, reach into the locking device 44 where it first passes by the ineffective extension 83 and then, further down, encounters the perpendicular surface 79 extending into the groove 43. When the user forcefully pushes the pull bar 25 further downward, the slide 73 is pushed back due to the action of the peg 26 on the perpendicular surface 79 against the effect of the helical spring 93 that prestresses it so that the area of the extension protruding into the clearance of groove 43 vanishes from the clearance.

So that this can be accomplished with ease, the surface 79 in the rest position shown in FIG. 12 jumps backward against the corresponding side wall of the groove 43 and causes with the retracting action for the slide 73 the peg 76 to be wedged between surface 79 and the opposite side wall of groove 43.

At the end of the downward motion, the peg 26 gets into the receptacle groove 47 and thus in front of the lower end of groove 43. The slide 73 can now be moved in the direction of the tailgate opening 7 by the helical spring 93. The force exerted by the helical springs 93 on the two sides of the tailgate opening 7 is together at least higher than the retractive force than the spring motor 19 can muster. The peg 26 is thus arrested between surface 81 and the walls of the receptacle groove 47 as shown in FIG. 12.

When the user begins to close the tailgate door 8, the tensile effect at the wire-like coupling link 92 ends soon after leaving the highest opening position of the tailgate door 8 and the helical spring 89 is in position to press the actuation cam 86 down. This causes the cam surface 87 to come into contact with the perpendicular 83, and due to the resulting cam drive, the force of the spring 89 can shift the slide 73 against the effect of the helical spring 93 which pushes the extension 78 from the clearance of the groove 43. At the same time, the extension 76 located further up on the front side 75 enters into the clearance as shown in FIG. 14. The peg 26 is released from the receptacle groove 47 due to the movement of the slide 73 and reaches the groove ascending in perpendicular direction, but remains hanging after a short distance of its movement path at the horizontal surface 82 of the extension. Peg 26 remains here as long as the actuation cam 86 is retracted from the position in FIG. 14 back into the position in FIG. 12 upon opening the tailgate door 8 and the spring 93 can press the slide 73 back.

This motion only occurs at the end of the opening motion of the tailgate door 8. If the user opens the tailgate door 9 only half-ways, the roll cover 15 remains in the closed position.

Figure 15:
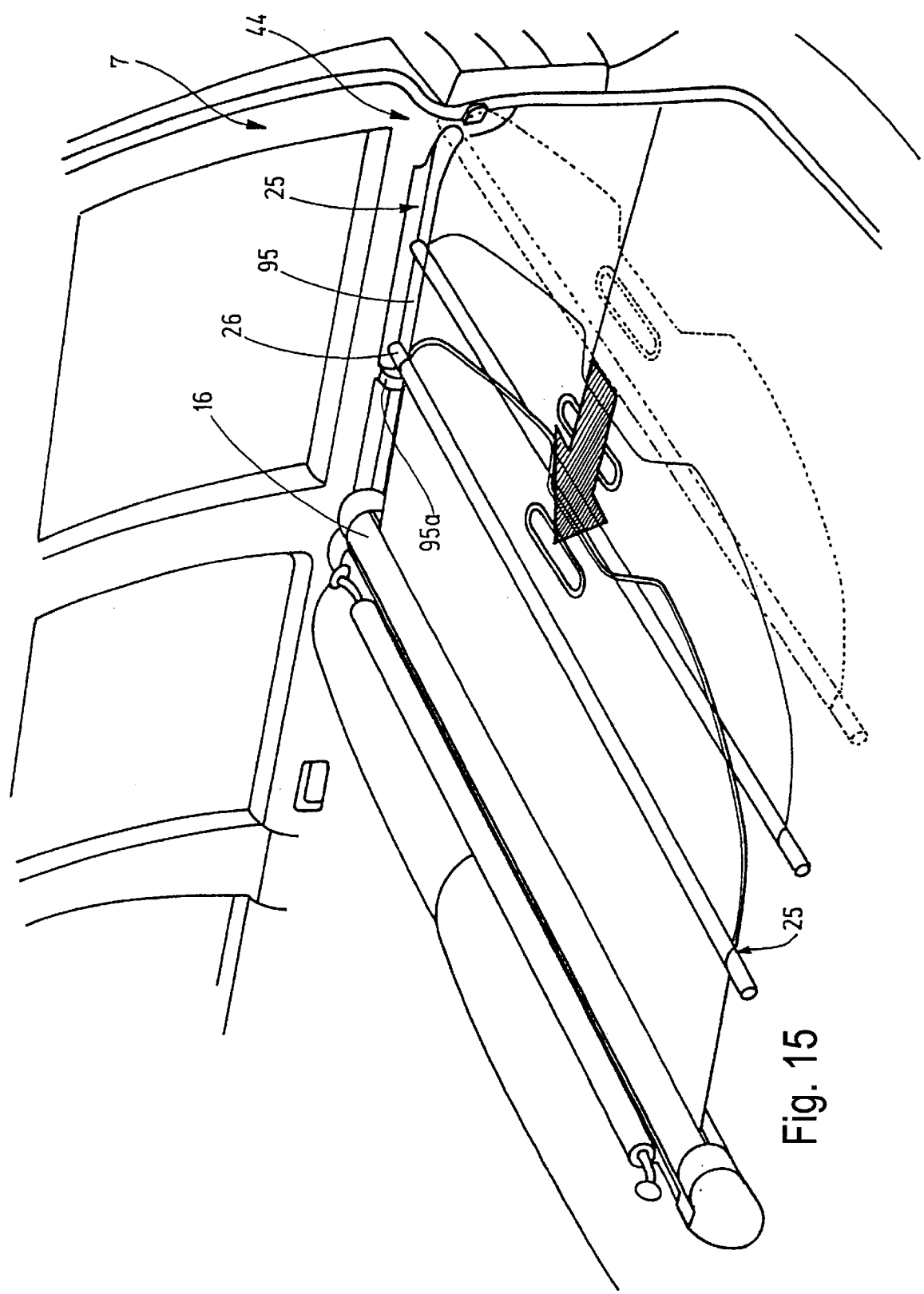
FIG. 15 is a perspective view of the car tailgate showing an exemplary embodiment of the roll cover with the horizontal pull bar.

While the compulsory guiding device is a completely closed groove shown in FIGS. 5 through 14, the compulsory guiding device 27 is formed in the exemplary surface embodiment in FIG. 15 by a horizontal straight shoulder surface 95 that starts at the housing 16 and runs to the tailgate opening 7. The peg 26 of the pull bar 25 is located on this upward facing shoulder surface 95. The intermediate position is reached with the aid of a stop 95a that lifts up from the shoulder surface 95 at the corresponding location and stops during the automatic retraction of the roll cover 15 the corresponding pegs 26.

Figure 16:
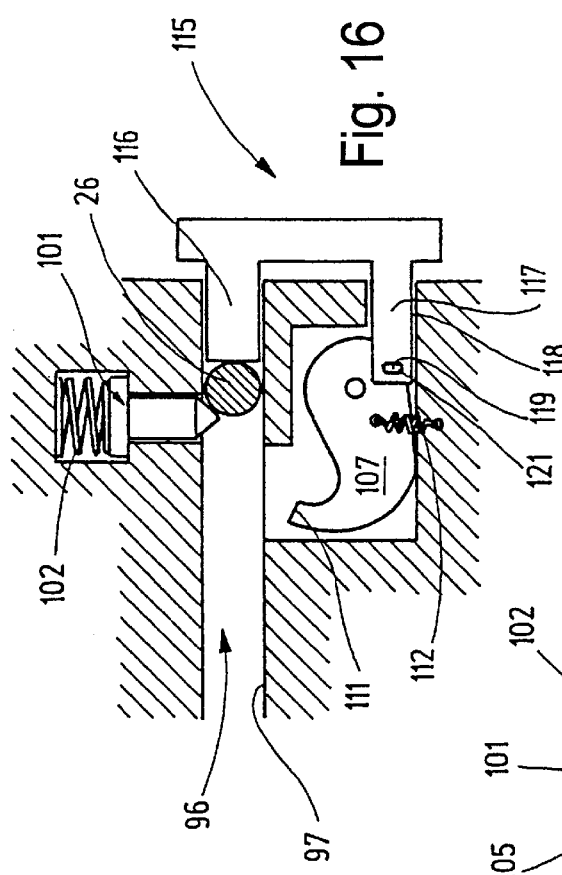
FIG. 16 shows a locking device for the roll cover in FIG. 15 in lateral view and in the first state.
Figure 18:
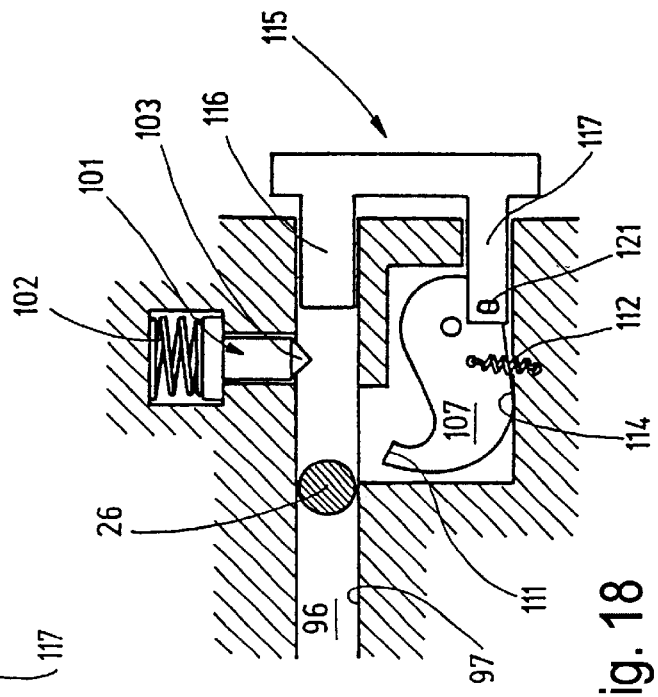
FIG. 18 shows the locking device in FIG. 16 in the second state.
Figure 17:
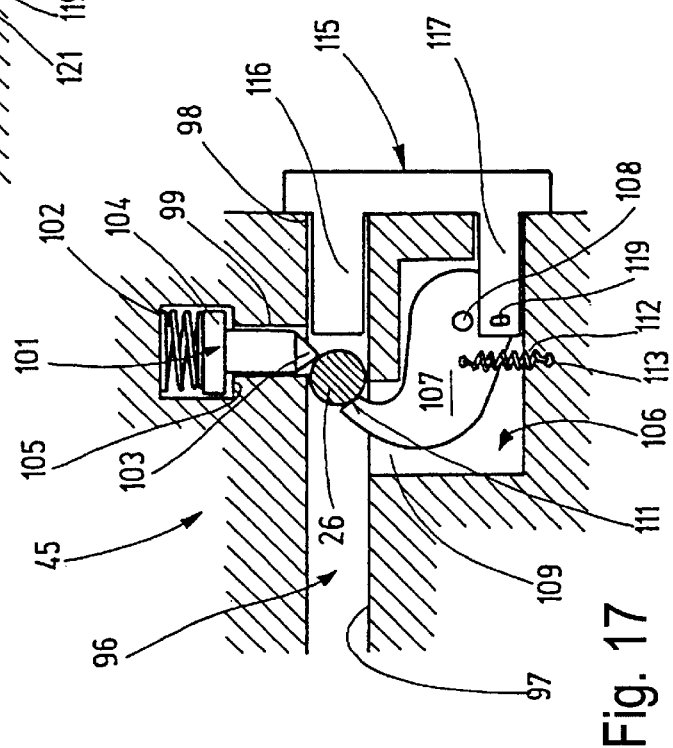
FIG. 17 shows the locking device in FIG. 16 in the third state.

At the end of the shoulder 95, i.e., in the vicinity of the tailgate opening 7, is another locking device 44 illustrated in FIGS. 16 through 18 in different operation positions.

The shoulder surface 95 runs with its tailgate-side end into the housing 45 where the shoulder surface 95 becomes a groove 96 in the manner that the lower groove wall 97 aligns with the shoulder surface 95. The groove 96 opens in the direction to the opposite side wall of the vehicle and continues until almost the tailgate opening 7, where an end 98 of the groove exits the housing 45.

Close to the end 98, a boring 99 containing a locking bolt 101 enters through which a spring 102 is prestressed in the direction toward the groove 96 so that a tip 103 of the bolt 101 can protrude a bit into the clearance of the groove 96. The advancing motion is limited by a flat head 104 that abuts to a corresponding shoulder 105 in the housing 45.

A holder 107 pivoting around an axis 108 is located in a chamber 106 below the groove 96. The chamber 106 is connected with the groove 96 via an opening 109 in the lower groove wall 97. It is located in reference to the motion direction of the peg 26 offset from the winding roller 18.

The holder has a buffer plate 111 which is designed to work together with the peg in the manner described below.

The holder 107 is prestressed into the position in FIG. 18 by means of the tension spring 112 that touches with its one end the holder 107 and is anchored with its other end at 113 in the housing 45. The holder 107 abuts with one stop surface 114 to the base of the chamber 106. In this position the stop surface 114 is retraced from the clearance of the groove 96.

An actuating slide 115 serves the actuating of the holder 107 and the compulsory shift of the peg 26. The actuating slide 115 has on the same side two extensions 116 and 117. The extension 16 protrudes through the end 98 of the groove 96 while the extension 117 leads through a boring 118 into the chamber 106. The extension 117 contains at its inner end a long hole 119 into which the peg 121 attached to the holder 107 glides.

The function is as follows:

If the user wants to bring the roller blind 15 into the closed position before he closes the tailgate door 18, he pulls the roller blind 17 with the rim facing him into the direction of the tailgate opening 7. In that, the pegs 26 slide on the shoulders 95 assigned to them and reach at the end of the slide motion into the grooves 96 of the locking devices 44 mounted at both sides. The pulling motion of the roller blind 17 is continued until the pegs 26 have passed the locking bolt 101 as shown in FIG. 16. The peg on each side lies then locked behind the tip 103 protruding into the clearance of groove 96 and in front of the inner end of the actuating extension 116.

The passage of peg 26 into this position was possible because the spring 112 had retracted the holder 107 into the chamber 106 which, at the same time, ejected the actuating slide 115 via the guides in the form of peg 121 and the long hole 119 in the direction of the tailgate opening 7. With locking the peg 26 behind the locking bolt 101, the first state of the locking device 44 is reached and the roller blind is held safely in the closed position because the retractive force acting on the roller blind 17 cannot overcome the locking force exerted by the locking bolt 101. When the user now closes the tailgate door 12, a segment abuts at the actuating slide 115 and presses it forward in the direction of the locking bolt 101. This presses the peg 26 forward below the locking bolt 101 into the position in FIG. 17. It cannot leave this position, however, because the advance of the actuation slide 115 over the kinematic connection with the holder 107 has reached its buffer plate 111 from the chamber 106 upward into the motion path of the peg 26.

When the tailgate door 8 is opened again, the tension spring 112 or the force exerted against the buffer plate 111 can push. the holder 107 back and free the motion path for peg 26. The roller blind 17 then retracts up to the intermediate position to the stop 95a.

In the roll cover for the cargo space or trunk of station wagons, a compulsory guiding device is connected with the front rim of the roller blind; it can be loosened. The compulsory guiding device provides that the roller blind can be moved upward when the tailgate door is opened so that easier access to the cargo space is assured without having to retract the roller blind completely into its housing.

What is claimed is:

1. A roll cover for covering a cargo space of a vehicle having a cargo space opening at a rear end defined by a tailgate door hinged to a body of the vehicle and pivotable with respect to a horizontal axis between open and closed positions, said roll cover comprising:

an oblong housing mounted within the cargo space and having a pull-out slot, a winding roller rotatably mounted within said housing, a roller blind attached at one edge to the winding roller, the roller blind being pullable out of the housing through the slot and having a movable pull bar attached at an edge parallel to the winding roller, a drive device coupled to the winding roller and biased for rolling the roller blind on the winding roller, a positive guiding device to which said pull bar is detachably connectable for providing two distinct end positions for the pull bar when said blind is pulled out from said housing, one of said end positions of said pull bar corresponding to a closed position of said roller blind wherein said roller blind covers said cargo space when said tailgate door is in a closed position, and the other of said pull bar end positions corresponding to an intermediate position of said roller blind wherein said roller blind permits access to said cargo space when said tailgate door in is in an open position, and said pull bar remaining within said vehicle body when in either of said end positions corresponding to said closed and intermediate positions of said roller blind.

2. The roll cover according to claim 1, wherein when the pull bar is in the end position corresponding to the intermediate position of the roller blind the pull bar is in a relatively higher position than when the pull bar is in the end position corresponding to the closed position of the roller blind.

3. The roll cover according to claim 1, wherein when the pull bar is in the end position corresponding to the intermediate position of the roller blind the pull bar is in a relatively lower position and relatively closer to the housing than when the pull bar is in the end portion corresponding to the closed position of the roller blind.

4. The roll cover according to claim 1, wherein the positive guiding device is configured such that when the pull bar is in the end position corresponding to the intermediate position of said roller blind the pull bar is closer to the housing than when the pull bar is in the end position corresponding to the closed position of said roller blind.

5. The roll cover according to claim 1, wherein the positive guiding device holds the pull bar in the end position corresponding to the closed position of the roller blind.

6. The roll cover according to claim 1, wherein coupling links are provided to couple the motion of the tailgate door with the movement of the pull bar at least over a part of movement of the pull bar between the end positions corresponding to the closed and the intermediate positions.

7. The roll cover according to claim 6, wherein the coupling links are rigid.

8. The roll cover according to claim 6, wherein the coupling links are elastically bendable.

9. The roll cover according to claim 6, wherein the coupling links are tensionably elastic.

10. The roll cover according to claim 6, wherein the positive guiding device includes two pivoting one-armed levers one of which is located on one side of the roller blind and wherein said levers are pivotable around coaxial axes that extend parallel to the winding roller.

11. The roll cover according to claim 10, wherein the levers have receptacles for receiving complementary segments of the pull bar.

12. The roll cover according to claim 11, wherein the levers have corresponding springs that prestress the levers at least for a distance in the direction of a position corresponding with the intermediate position of the roller blind.

13. The roll cover according to claim 10, wherein each said lever has a coupling link for operably connecting the lever with the tailgate door.

14. The roll cover according to claim 1, wherein the positive guidance device includes guide grooves disposed next to sides of the cargo space opening.

15. The roll cover according to claim 14, wherein the guide grooves contain ends of the pull bar in a longitudinally adjustable manner.

16. The roll cover according to claim 14, wherein slides extend in a longitudinally adjustable manner in the guide grooves.

17. The roll cover according to claim 16, wherein the slides carry receptacles for receiving ends of the pull bar.

18. The roll cover according to claim 16 wherein each said slide has a coupling link for operably connecting the slide with the tailgate door.

19. The roll cover according to claim 16, wherein said slides have corresponding springs that prestress the slides.

20. The roll cover according to claim 1, wherein stops are provided that define the one end position of the pull bar corresponding to the closed position of the tailgate door.

21. The roll cover according to claim 1, wherein the positive guiding device includes a corresponding locking device which is operable in first, second and third states, wherein in the first state a motion of the pull bar from said one end position is prevented, in the second state the motion of the pull bar from said one end position is released, and in the third state the pull bar is held in said one end position depending on the position of the tailgate door.

22. The roll cover according to claim 21, wherein the locking device operates in direct relation with the pull bar.

23. The roll cover according to claim 21, wherein the locking device includes a groove into which a respective end of the pull bar must be guided and includes a recess configured such that the tension force exerted by the winding roller automatically holds the end of the pull bar in the recess, wherein the arrangement of the pull bar in the recess corresponds with the first state of the locking device.

* * * * *